United States Patent
Craft et al.

(10) Patent No.: US 8,127,289 B2
(45) Date of Patent: Feb. 28, 2012

(54) ENABLING A THIRD PARTY APPLICATION TO PARTICIPATE IN MIGRATION OF A VIRTUALIZED APPLICATION INSTANCE

(75) Inventors: David J. Craft, Austin, TX (US); Vinit Jain, Austin, TX (US); Lance W. Russell, Rosanky, TX (US); Srikanth Vishwanathan, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1280 days.

(21) Appl. No.: 11/769,347

(22) Filed: Jun. 27, 2007

(65) Prior Publication Data
US 2009/0007147 A1 Jan. 1, 2009

(51) Int. Cl.
G06F 9/455 (2006.01)
G06F 15/173 (2006.01)
G06F 11/00 (2006.01)
(52) U.S. Cl. ................. 718/1; 709/224; 714/15
(58) Field of Classification Search .............. None
See application file for complete search history.

(56) References Cited

U.S. PATENT DOCUMENTS

| 2007/0276879 | A1* | 11/2007 | Rothman et al. | 707/202 |
| 2008/0120518 | A1* | 5/2008 | Ritz et al. | 714/3 |
| 2009/0007147 | A1* | 1/2009 | Craft et al. | 719/320 |

FOREIGN PATENT DOCUMENTS
FR 0407180 1/2006

OTHER PUBLICATIONS

Gest, SB Koenen, WP, "Portable Object-Oriented Event Manager", IBM Technical Disclosure Bulletin, Jun. 1994, vol. 37, publicaiton 6B, pp. 554-556, 3 pages.

* cited by examiner

Primary Examiner — Kenneth Tang
(74) Attorney, Agent, or Firm — Matthew W. Baca; Amy J. Pattillo

(57) ABSTRACT

An operating system manages virtualized instances of hardware resources and migration enabled applications partitioned into one of multiple partitions with a separate operating system kernel running in each of the partitions. A migration event controller of the operating system manages the checkpoint and restart process during migration of a virtualized instance of at least one migration enabled application from a departure partition to an arrival partition. The migration event controller supports migration enabled applications to separately specify at least one application specific checkpoint script and restart script to be triggered by checkpoint and restart events by the migration event controller so the at least one migration enabled application can participate in performing the checkpoint and restart process for additional state information during migration of the virtualized instance from the departure partition to the arrival partition.

17 Claims, 4 Drawing Sheets

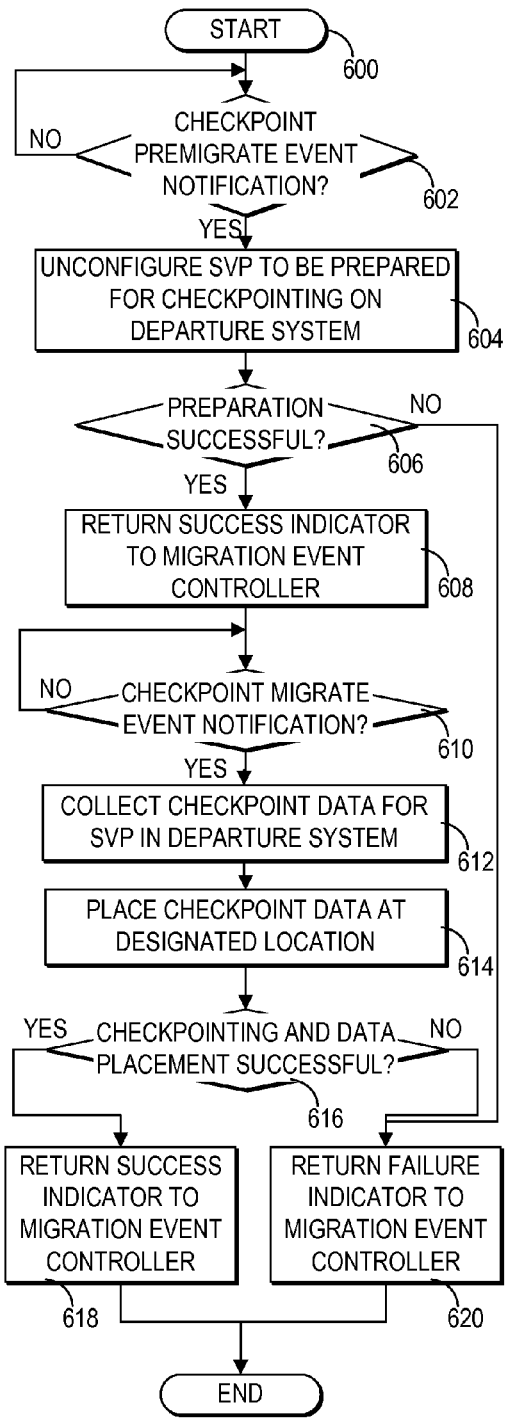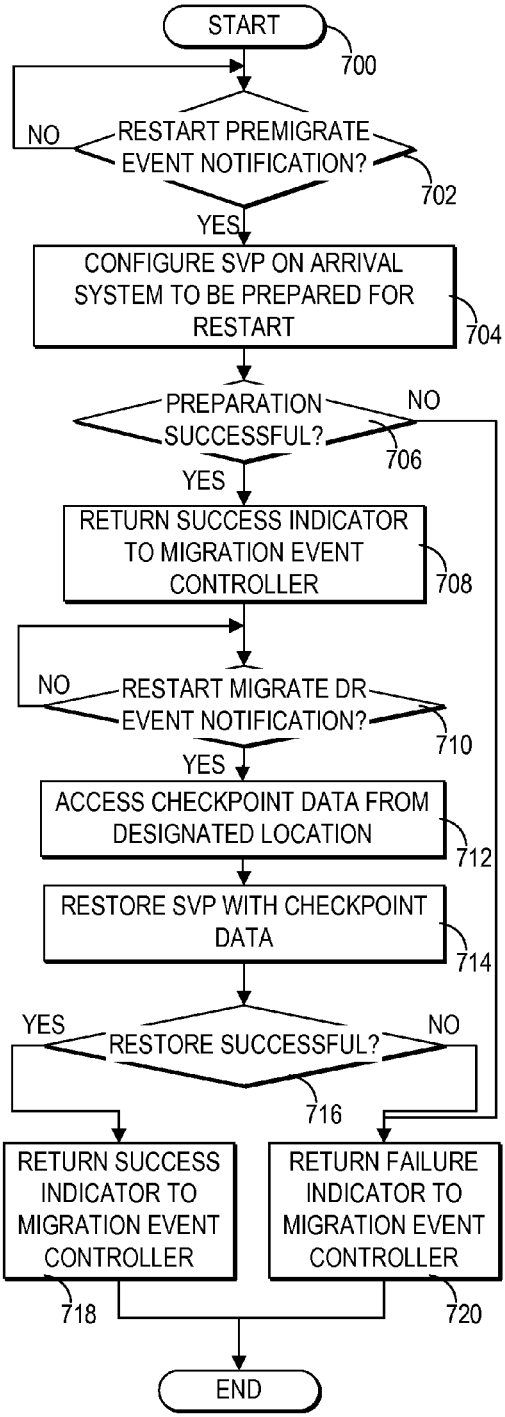
FIG. 6
FIG. 7

US 8,127,289 B2

ENABLING A THIRD PARTY APPLICATION TO PARTICIPATE IN MIGRATION OF A VIRTUALIZED APPLICATION INSTANCE

BACKGROUND OF THE INVENTION

1. Technical Field

The present invention relates in general to improved management of virtualized systems. Still more particularly, the present invention relates to an operating system virtualization controller enabling a third party, migration enabled application to participate in migration of a virtualized application instance of the third party application.

2. Description of the Related Art

Virtualization of both hardware resources and software resources continues to provide a method for platform and software developers to improve hardware and software performance. In particular, when a system virtualizes resources, the logical representation of these resources may provide a finer granularity of sharing the resources among applications as needed to perform jobs.

In one example, a system may virtualize hardware resources into multiple divisions or partitions, where each partition includes a portion of the computer's processors, memory and other hardware resources. A computer's operating system may run within a single instance of the computer's partitioned resources or across multiple partitioned resource instances. In another example, a system may support virtualization by facilitating dynamic partitions, where the system can logically attach and detach hardware resources to and from different partitions without requiring the hardware resources or operating system instance of the partition to be rebooted. Further, in supporting virtualization, a system may virtualize applications and provide mobility for a virtualized software container for redistribution among partitions.

A system which supports mobility of a software virtualization from one partition to another without rebooting may accomplish the migration using checkpoint and restart operations, where the checkpoint operation captures the state of the processes of a software virtualization and a restart operation restarts the processes from the captured state. For most commercial applications, the application need not be aware that it is running in a software virtualization or that the software virtualization could be moved from one partition to another on the fly. For some applications, however, checkpoint and restart operations performed by the operating system which capture the state of processes are not sufficient to transfer the state of the entire software virtualization because the virtualized application maintains unique state information in addition to process state information. For example, for a file system application with its own operating system kernel extensions for controlling file system functions through the kernel, the system's checkpoint operation would not detect the state of file system information performed through the kernel extensions, but the file system kernel extension operations would need to be performed on the arrival system before the restart operation. In another example, an application may initiate changes in the kernel environment which would not be detected in the process states detected by a system's checkpoint operation, but which would need to be changed in the kernel environment on the arrival system before the restart operation is performed.

Because some applications maintain important state data in addition to process state information captured during a system's checkpoint operation, there is a need for migrating the additional state data unique to a particular application with the migration of the virtualized application instance. In particular, there is a need for an operating system which manages resource virtualization to enable a third party application to participate in the migration process so that the application can independently control the migration of additional state information unique to the virtualized application instance.

SUMMARY OF THE INVENTION

Therefore, the present invention provides, in general, management of virtualized systems and in particular, provides for an operating system virtualization controller which enables a third party, migration enabled application to participate in migration of a virtualized application instance.

In one embodiment, an operating system manages virtualized instances of hardware resources and migration enabled applications partitioned into one of multiple partitions. A mobility controller of the operating system manages the checkpoint and restart process during migration of a virtualized instance of at least one migration enabled application from a departure partition to an arrival partition. The mobility controller supports migration enabled applications to separately specify at least one application specific checkpoint script and restart script to be triggered by checkpoint and restart events by the mobility controller so the at least one migration enabled application can participate in performing the checkpoint and restart process for additional state information during migration of the virtualized instance from the departure partition to the arrival partition.

In one example, the mobility controller enables the migration enabled applications to separately register application specific checkpoint scripts and restart scripts with the mobility controller. The mobility controller notifies the registered scripts of checkpoint events and restart events during migration of the virtualized instance to trigger the registered scripts to handle migration of at least a portion of additional state information for the virtualized instance. In another example, the mobility controller sends a signal indicating a checkpoint event or restart event and the migration enabled application trips the signal and triggers one of the application specific checkpoint scripts or restart scripts.

In managing migration of a virtualized instance, the mobility controller manages checkpoint and restart operations to checkpoint the state of at least one process of the virtualized instance at the departure partition and to restart the process from the captured state on the arrival partition without requiring a reboot of the arrival partition. In addition, the mobility controller enables migration enabled applications to run scripts for participating in checkpoint and restart operations without requiring a reboot of the arrival partition by requiring the checkpoint scripts capture and store additional state information from the departure partition in a shared location and requiring the restart scripts restore the virtualized instance at the arrival partition with the additional state information accessed from the shared location.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a high level logic flowchart illustrating a process and program for a migration enabled application script to participate in a checkpoint migration event; and FIG. 7 is a high level logic flowchart depicting a process and program for a migration enabled application script to participate in a restart migration event.

DETAILED DESCRIPTION OF THE PREFERRED EMBODIMENT

Figure 1:
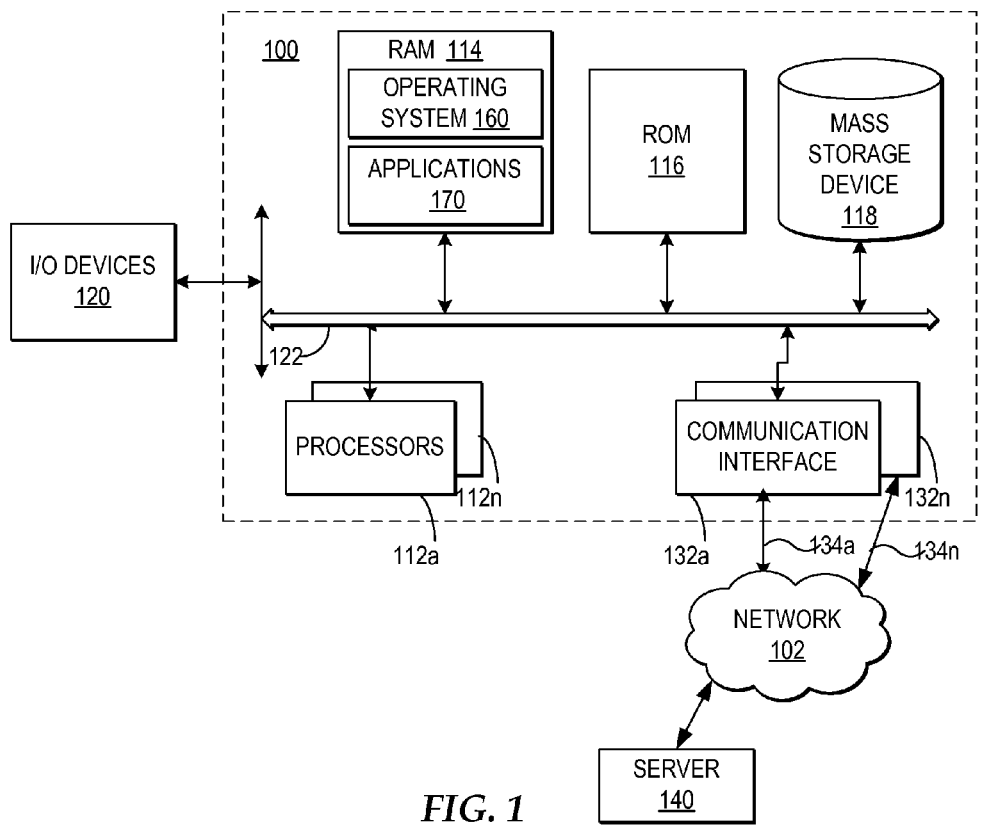
FIG. 1 is a block diagram depicting a computer system in which the present method, system, and program may be implemented.

Referring now to the drawings and in particular to FIG. 1, there is depicted one embodiment of a computing system through which the present method, system, and program may be implemented. The invention may be executed in a variety of systems, including a variety of computing systems and electronic devices.

Computer system 100 includes a bus 122 or other communication device for communicating information within computer system 100, and at least one processing device such as one of processors 112a-112n, coupled to bus 122 for processing program code and data. Bus 122 may include low-latency and higher latency paths that are connected by bridges and adapters and controlled within computer system 100 by multiple bus controllers. Processors 112a-112n may be a general-purpose processor such as IBM's PowerPC (PowerPC is a registered trademark of International Business Machines Corporation) processor.

Processors 112a-112n are coupled, directly or indirectly, through bus 122 to memory elements. During normal operation, processors 112a-112n process data under the control of program code accessed from the memory elements. Memory elements can include local memory employed during actual execution of the program code, such as random access memory (RAM) 114, bulk storage, such as mass storage device 118, and cache memories (not depicted) which provide temporary storage of at least some program code to reduce the number of times code must be retrieved from bulk storage during execution. In one example, the program code accessible in RAM 114 is an operating system 160 and applications 170. Operating system 160 includes program code that facilitates, for example, virtualization of one or more of instances of operating system 160 and other operating systems, applications 170, processors 112a-112n, RAM 114, ROM 116, mass storage device 118, communication interfaces 132a-132n and I/O devices 120.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. For example, in one embodiment, operating system 160 contains program code and applications 170 contain program code that when executed on virtualized selections of processors 112a-112n enables operating system 160 to manage migration of virtualized resources and enables a third party, migration enabled application within applications 170 to participate in the checkpoint and restart operations during migration of a virtualized application instance as depicted in the flow diagrams and flowcharts of FIGS. 4, 5, 6, and 7, for example, and other operations described herein. Alternatively, the steps of the present invention might be performed by specific hardware components that contain hardwired logic for performing the steps, or by any combination of programmed computer components and custom hardware components. Additionally, RAM 114 may include an application programming interface or other interface that provides extensions to enable application developers to develop software that extends the functionality of operating system 160 or applications 170 to enable third party applications to participate in checkpoint and restart operations during migration of a virtualized application instance.

The present invention may be provided as a computer program product, included on a computer usable or machine-readable medium having stored thereon the executable instructions of a computer-readable program that when executed on computer system 100 cause computer system 100 to perform a process according to the present invention. The terms "computer-usable medium" or "machine-readable medium" as used herein include any medium that participates in providing instructions to processors 112a-112n or other components of computer system 100 for execution. Such a medium may take many forms including, but not limited to, storage-type media, such as non-volatile media and volatile media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114.

Moreover, the present invention may be downloaded or distributed as a computer program product, wherein the computer-readable program instructions may be transmitted from a remote computer such as a server 140 to requesting computer system 100 by way of data signals embodied in a carrier wave or other propagation medium via network 102 to a network link 134 (e.g. a modem or network connection) to one of communication interfaces 132a-132n coupled to bus 122. Communications interfaces 132a-132n provide two-way data communications coupling to network links 134a-134n that may be connected, for example, to a local area network (LAN), wide area network (WAN), or directly to an Internet Service Provider (ISP). In particular, network links 134a-134n may provide wired and/or wireless network communications to one or more networks, such as network 102. Further, although not depicted, communication interfaces 132a-132n may include software, such as device drivers, hardware, such as adapters, and other controllers that enable communication. When implemented as a server, computer system 100 may include multiple communication interfaces accessible via multiple peripheral component interconnect (PCI) bus bridges connected to an input/output controller, for example. In this manner, computer system 100 allows connections to multiple clients via multiple separate ports and each port may also support multiple connections to multiple clients.

Network links 134a-134n and network 502 both use electrical, electromagnetic, or optical signals that carry digital data streams. The signals through the various networks and the signals on network links 134a-134n and through communication interfaces 132a-132n, which carry the digital data to and from computer system 100, may be forms of carrier waves transporting the information.

In addition, computer system 100 typically includes input/output (I/O) devices 120 (e.g. multiple peripheral components) that facilitate communication and may hold data. These peripheral components are coupled to computer system 100 either directly or indirectly through connections to multiple input/output (I/O) controllers, adapters, and expansion slots coupled to one of the multiple levels of bus 122. Examples of I/O devices 120 include, but are not limited to audio I/O devices for controlling audio inputs and outputs, display devices for providing visual, tactile, or other graphical representation formats, a cursor control devices for controlling the location of a pointer within the display devices, and a keyboard as an interface for inputs to computer system 100. In addition, I/O devices may include thumb drives or other portable data storage devices connected to computer system 100 via the I/O controllers, adapters, or expansion slots.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
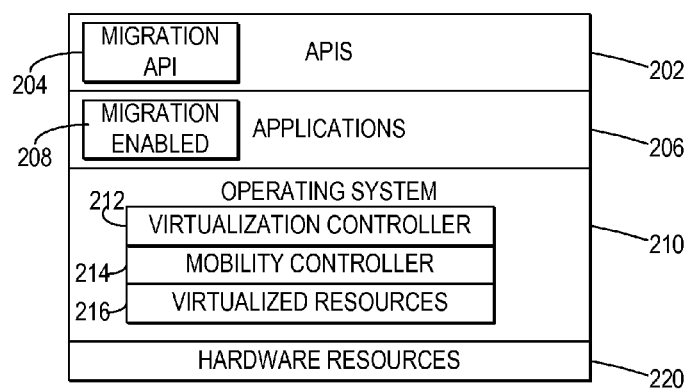
FIG. 2 is a block diagram illustrating one embodiment of layers of a system for supporting third-party application participation in the migration of the virtualized application instance.

With reference now to FIG. 2, a block diagram depicts one embodiment of layers of a system for supporting third-party application participation in the migration of the virtualized application instance. It will be understood that additional or alternate system configurations and software layers may be implemented in a system which enables an application to participate in migration of the software virtualization of the application.

In the example, in one embodiment, an applications layer 206, including applications 170 for example, runs atop an operating system layer 210, implementing operating system 160 for example, which manages execution of applications 206 on hardware resources 220. Hardware resources 220 may include, but are not limited to, memory, such as RAM 114, ROM 116, and mass storage device 118, processors, such as processors 112a-112n, input/output interfaces such as the interface to I/O devices 120, communication interfaces 132a-132n, and network links 134a-134n.

Operating system layer 210 includes a virtualization controller 212 for managing virtualized resources 216. Virtualization controller 212 may include one or more types of controllers for implementing and managing virtualized resources including, but not limited to, firmware and a hypervisor. Virtualized resources 216 may include, but are not limited to, multiple partitions, containers, or other types of groupings of logical representations of hardware within hardware resources layer 220, applications within applications layer 206, and one or more instances of an operating system kernel. Within virtualized resources 216, hardware and software resources may be represented as logical resources which can be shared among groupings, globally accessible among groupings, or only accessible within a particular grouping.

Alternatively, operating system layer 210 may view virtualized resources 216 as one or more partitions of physical hardware resources, which may represent separate computer system instances, among which virtualized application instances of applications within applications layers 206 run.

A mobility controller 214 manages the operations for adding or removing resources from virtualized resources 216 or migrating resources within virtualized resources 216. In one embodiment, the act of adding, removing or migrating resources within virtualized resources 216 is referred to as a migration event.

Applications within applications layer 206 which are migration enabled, as illustrated at reference numeral 208, are notified of migration events. A migration enabled application includes scripts, which may also be referred to as handlers, which when triggered by a migration event, handle a function for the application to enable the application to participate in the migration event. In one example, a migration enabled application registers scripts with mobility controller 214 and mobility controller 214 notifies the registered application scripts of migration events so the application can participate in adding, removing or migrating the resource or resources to be reconfigured through scripts for controlling the application in response to the triggering migration event. In another example, mobility controller 214 may send a signal indicating a migration event which migration enabled applications are configured to trap and, in response, call a migration API 204 to access the type of migration event, so the application can participate in adding, removing, or migrating the resource or resources to be reconfigured through scripts for controlling the application in response to the triggering migration event. Further, a migration enabled application may poll mobility controller 214 or virtualized resources 216 periodically for a virtualized application status. It will be understood that mobility controller 214 may support or implement additional or alternate processes for notifying migration enabled applications of migration events. In addition, as will be further described, mobility controller 214 may trigger a series of migration events for controlling the addition, removal, or migration of a resource within virtualized resources 216. As described herein, a migration enabled application may represent an application developed by a party other than the party who developed operating system layer 210, also referred to as a "third party application."

In one example, applications layer 206 and operating system layer 210 may communicate with application programming interfaces (APIs) 202 to control output of data to a user or application and through which a user or application may control inputs to or request data from application layer 206 or operating system layer 210. In one example, APIs layer 202 may support a console or other graphical user interface through which a user may define the partitions or other groupings of resources to be managed by virtualization controller 212 within virtualized resources. The API layer receiving the user definition of a partition translates the user definition into a request to add a resource, remove a resource, or migrate a resource, for example, and passes the request to virtualization controller 212 of operating system layer 210 for management by mobility controller 214.

Figure 3:
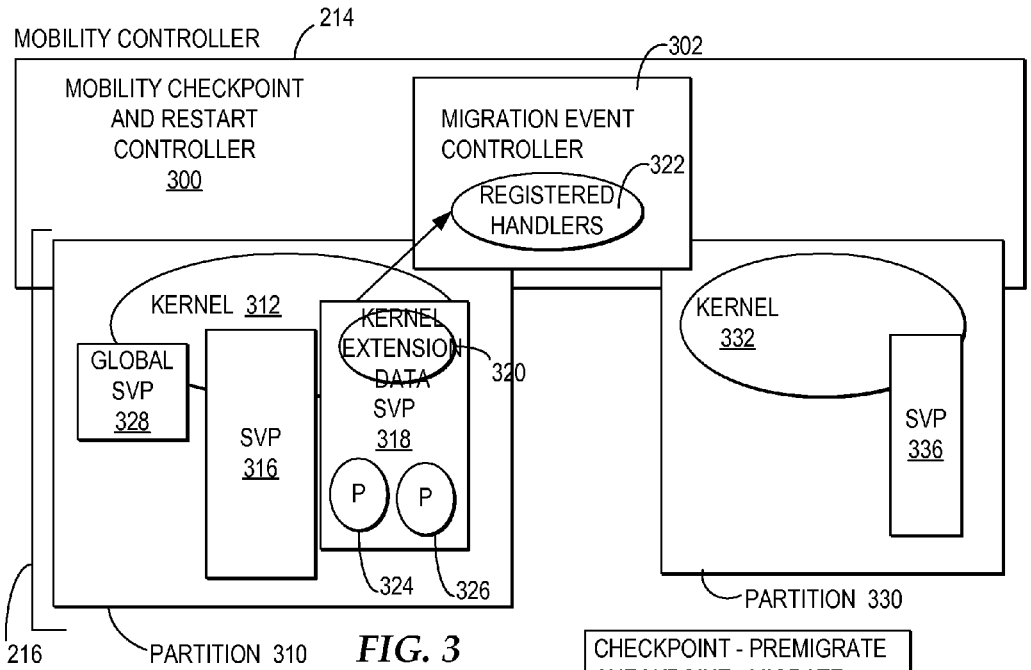
FIG. 3 is a block diagram depicting one embodiment of a virtualized application instance registered with a mobility controller to participate in migration events of the virtualized application instance.

Referring now to FIG. 3, a block diagram depicts one embodiment of a virtualized application instance registered with a migration event controller to participate in migration events of the virtualized application instance. In the example, virtualized resources 316 include partitions 310 and 330. It will be understood that virtualized resources 316 may include additional or alternate partitions or other groupings, logically and physically, of hardware and application resources.

In the example, each of partition 310 and partition 330 include selections of hardware resources from hardware resources layer 220. An instance of an operating system kernel of operating system layer 210 runs across partition 310 and partitions 330, as illustrated by kernel 312 and kernel 332. In an additional example, kernel 312 and kernel 332 may represent separate instances of operating system kernels from the same or different operating system platforms.

In addition, in the example, each of partition 310 and partition 330 include software virtual partitions (SVPs) which include virtualized application instances of one or more applications from application layer 206. As illustrated, a SVPs may also represent a container for multiple virtualized application instances for multiple applications or a container for virtualized application instances of only a portion of an application, such as SVPs 316, 318, and 336. In addition, a SVP may include a global SVP which includes globally accessible data and processes for a partition, such as global SVP 328.

In the example, mobility controller 214 controls additions to, deletions from, and migration of partitions and resources within partitions, including SVPs. In particular, mobility controller 214 implements a global mobility checkpoint and restart (MCR) controller 300 and a global or partitioned migration event controller 302. For a migration event, MCR controller 300 determines which resources are required to be moved, which partitions require notifications of migration events and directs migration event controller 302 to handle migration events for particular partitions and SVPs.

In the example depicted, migration event controller 302 may be implemented globally or locally in one or more instances. In one example, each of partition 310 and partition 330 may include a separate instance of the migration event controller 302, where MCR controller 300 separately triggers each instance of the migration event controller.

In the example, migration of a SVP from one partition to another partition is controlled by MCR controller 300 by triggering migration event controller 302 to run a checkpoint operation to capture the state of each process on the SVP on the departure partition and then triggering migration event controller 302 to restart all the processes in the same state on the arrival partition. For example, migration event controller 302, as prompted by MCR controller 300, runs a checkpoint operation and captures the state of processes 324 and 326 in SVP 318 if partition 310 is the departure partition.

Some applications, however, when virtualized in a SVP, implement data which needs to be separately handled by the application in order for the application, during checkpoint and restart for the SVP, to function properly when migrated. In the example, a particular application virtualized in SVP 318 may include data which needs to be separately handled by the application during SVP 318 checkpoint and restart operations because kernel extension data 320 of the application maintain additional state information specific to SVP 318 within kernel 312 that must be separately checkpointed and restored for the kernel extensions to function properly on the arrival partition. Although not depicted, in another example, kernel extension data 320 may maintain data within global SVP 328 which would need to be separately handled during checkpoint and restart operations of SVP 318.

In another example, other types of state information may need to be separately captured and restored by the application. For example, a file system application may need to capture and resource mount point information set by a kernel. In another example, an application may need to ensure that any environment changes within partition 310 initiated by the application before a checkpoint are also initiated on arrival partition 330 before restart.

In particular, when MCR controller 300 prompts migration event controller 302 to perform checkpoint and restart events, migration event controller 302 supports migration enabled application participation in the checkpoint and restart operations during migration of a SVP. In one example, migration event controller 302 may allow a migration enabled application to register to receive migration event notifications or migration event controller 302 may send a signal for migration events which an application may trap and call migration API 204 to determine which type of migration event occurred.

Migration enabled applications include handlers or other types of scripts which when triggered by a checkpoint or restart migration event, handle the migration of the data for a SVP which needs to be separately handled by the virtualized application instance. In the example, SVP 318 registers handlers, as illustrated at reference numeral 322, to be triggered by migration events from migration event controller 302. Registered handlers 322 represent the specialized scripts or routines, specified within the application virtualized in SVP 318 and registered with migration event controller 214, for handling migration of kernel extension data 320. In particular, during the registration process, handlers 322 are registered according to whether the handler is to be invoked by a checkpoint operation or restart operation and may specify the classes of checkpoint and restart events to be handled.

In another example, instead of registering handlers with migration event controller 302, SVP 318 may include a script for trapping a signal sent by migration event controller 302 and calling migration API 204 to determine which type of checkpoint or restart migration event is triggered and to trigger the handlers for the triggered checkpoint or restart migration event. By enabling an application, and in particular a third party application, to include specified handlers for scripts or routines to be triggered for checkpoint and restart events during migration of a SVP, migration event controller 302 enables third party, migration enabled applications to participate in migration of the virtualized application instance in a SVP.

Figure 4:
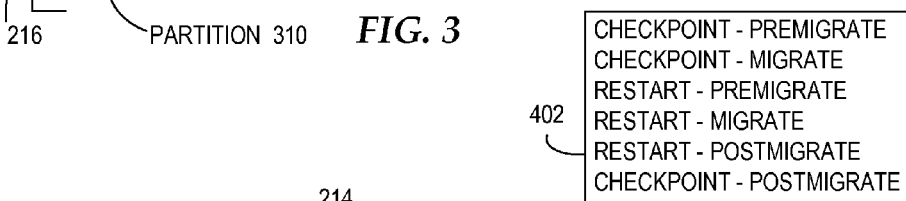
FIG. 4 is a block diagram illustrating one example of registered application scripts for participating in migration of kernel extension data for the virtualized application instance from one partition to another partition.
Figure 4:
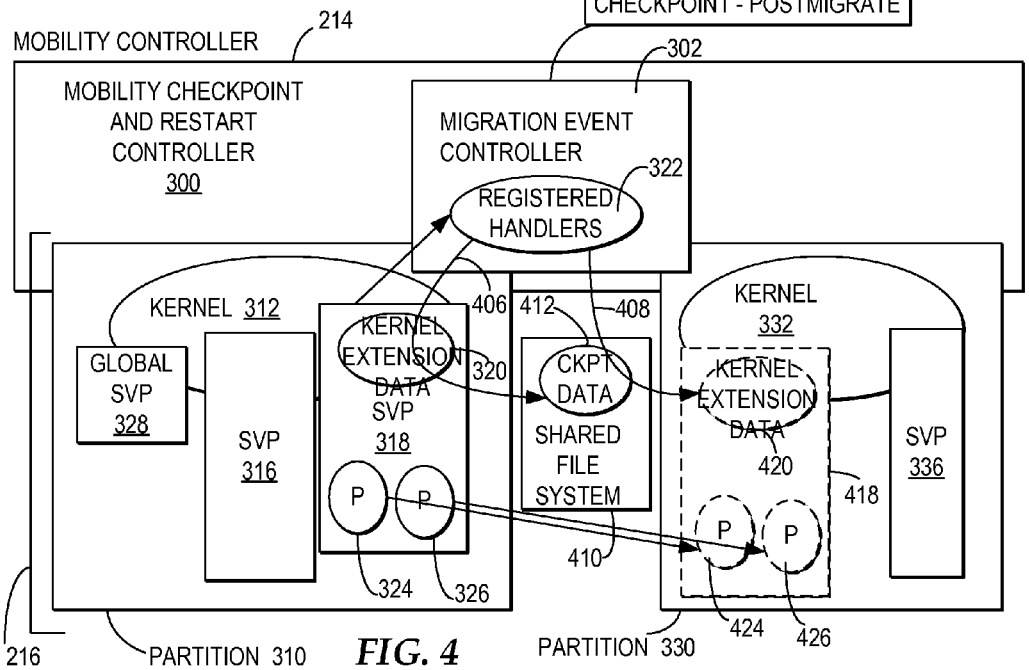

With reference now to FIG. 4, a block diagram illustrates one example of a migration of a software virtual partition with an application participating in migration of kernel extension data for the virtualized application instance within the software virtual partition.

First, in the example, as triggered by MCR controller 300, migration event controller 302 controls checkpoint and restart of processes 324 and 326 to migrate SVP 318 from partition 310 and to partition 330 without requiring partition 310 to stop SVP 318 for the migration and without requiring partition 330 to reboot for the migration. In one example, migration event controller 302 performs the checkpoint and restart of processes 324 and 326 by pausing each of the processes in partition 310, taking a snapshot of the process state each of the processes in partition 310, moving the process state data to a new instance of the SVP within partition 330, and unpausing the processes within the new location within partition 330 as illustrated at reference numeral 424 and 426.

Second, the virtualized application instance on SVP 318 need not be aware of the migration of processes 324 and 326 on the fly. For migration of kernel extension data 320, however, the virtualized application instance on SVP 318 has registered handlers 322 registered to receive notifications of checkpoint and restart events during migration of SVP 318. Migration event controller 302 notifies applications of checkpoint and restart migration events during migration of the processes within a SVP, so that handlers of an application can participate in the migration of the SVP from one partition to another partition. In one example, migration event controller 302 defines multiple migration events for checkpoint and restart migration which are classified in a premigrate class, a migrate class and a postmigrate class, as illustrated at reference numeral 402. Each of the migration event classes may include one or more migration event notifications per class.

In the example, migration event controller 302 notifies registered handlers 322 of checkpoint events for partition 310 and notifies registered handlers 322 of restart events for partition 330. In one example, where migration event controller 302 is implemented by a separate instance on each of partition 310 and partition 330, MCR controller 300 would trigger the migration event controller instance in partition 310 with checkpoint events and would trigger the migration event controller instance in partition 330 with restart events.

In the example, a checkpoint premigrate class of events triggers one or more handlers within registered handlers 322 to check, on partition 310, whether SVP 318 can be migrated from partition 310 and if SVP 318 can be migrated, to prepare SVP 318 for checkpointing. Next, a checkpoint migrate class of events triggers one or more handlers within registered handlers 322 to checkpoint specified data of SVP 318 and to store the specified data in a storage location or place the data on a network socket, as illustrated at reference numeral 406. In particular, in the example, the triggered handler checkpoints the data in kernel extension data 320 and places the checkpointed data from kernel extension data 320 in a shared file system 410, as illustrated by CKPT data 412

In addition, in the example, a restart premigrate class of events triggers one or more handlers within registered handlers 322 to reconfigure SVP 318 within partition 330 to be restarted on partition 330 as illustrated at reference numeral 418. Next, as depicted at reference numeral 408, a restart migrate class of events triggers one or more handlers within registered handlers 322 to access CKPT data 412 from shared file system 410 and use the checkpointed data to restore the state of kernel extension data 320 within the arrival system of partition 330 illustrated at reference numeral 420. Thereafter, a restart postmigrate class of events triggers one or more handlers within registered handlers 322 to perform any reconfiguration SVP 318 may require as a result of movement to partition 330 as depicted at reference numeral 418. Similarly, thereafter, a checkpoint postmigrate class of events triggers one or more handlers within registered handlers 322 to perform any reconfiguration required within partition 310 as a result of the migration of SVP 318.

In addition, handlers may return error or failure signals to migration event controller 302 and migration event controller 302 may trigger additional handlers within registered handlers 322 to handle the errors which occur during the migration process. In particular, registered handlers 322 may include handlers for responding to error events and undoing the portion of the migration phase previously performed.

It will be understood that while FIG. 4 is described with reference to handlers registered for kernel extension data 320 capturing the additional state information represented by kernel extension data 320, in other embodiments, applications may register handlers or other scripts to capture the state of other types of information required by an application when a virtualized application instances migrates in a SVP.

In addition, it is important to note that while FIG. 4 is described with reference to registered handlers 322 including handlers for placing the checkpoint data on shared file system 410 and retrieving the checkpoint data from shared file system 410, in other embodiments, a third party application developer may select other locations for handlers to share checkpoint data between a departure system and an arrival system, such as a network socket.

Figure 5:
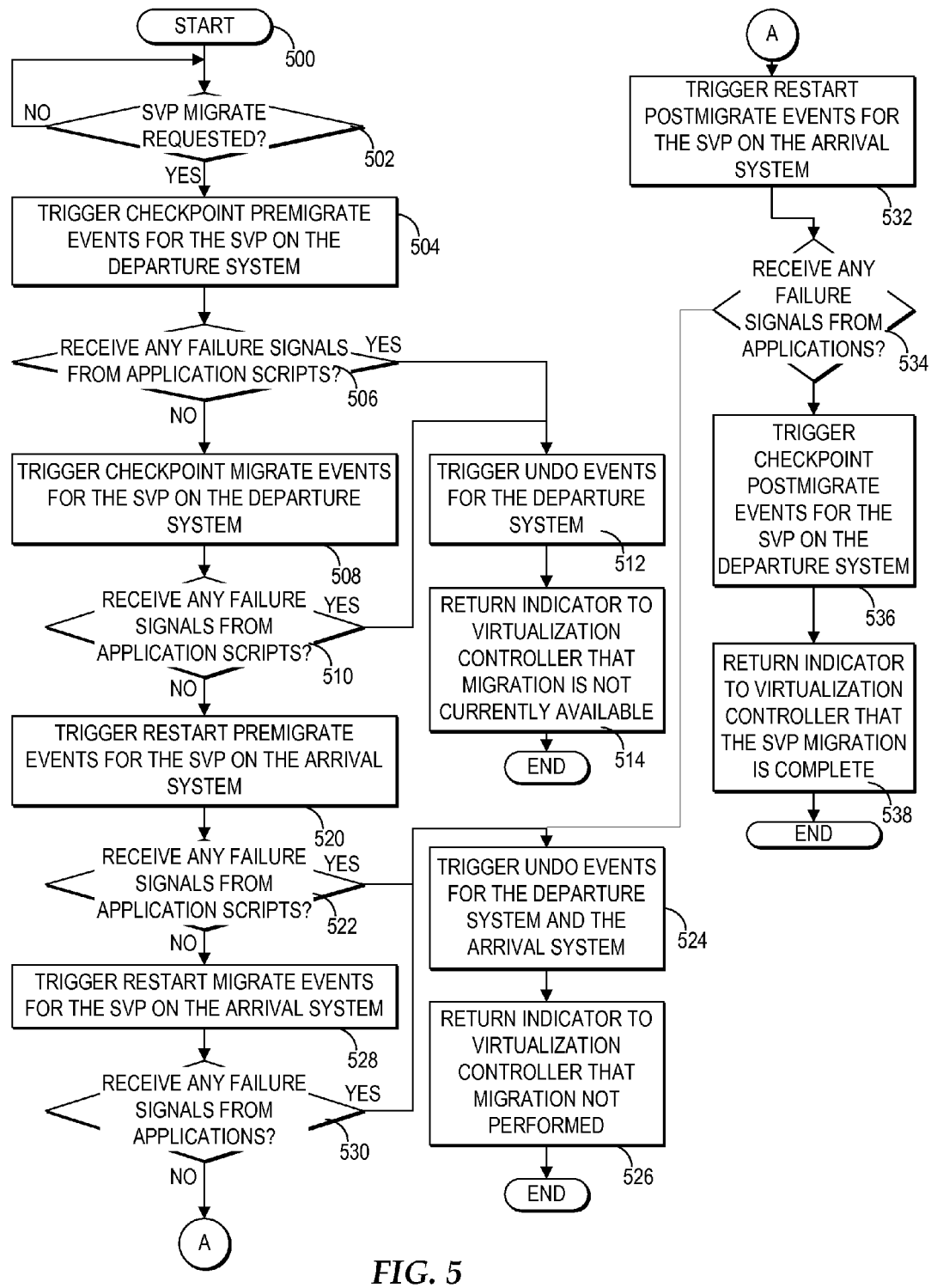
FIG. 5 is a high level logic flowchart depicting a process and program for notifying applications of checkpoint and restart migration events.

With reference now to FIG. 5, a high level logic flowchart depicts a process and program for notifying migration enabled applications of checkpoint and restart events to enable migration enabled, third party applications to participate in migration of a virtualized application instance of the third party application. In the example, the process starts at block 500 and thereafter proceeds to block 502. Block 502 illustrates a determination by a mobility controller whether a SVP migrate request is detected. If a SVP migrate request is detected, then the process passes to block 504.

Block 504 depicts triggering the checkpoint premigrate events for the SVP on the departure system. Next, block 506 illustrates a determination whether the mobility controller receives any failure signals from application scripts triggered by the checkpoint premigrate events. If any failures signals are detected, then the process passes to block 512. Block 512 depicts triggering undo events for triggering application scripts to undo the checkpoint processes performed to that point on the departure system. Next, block 514 illustrates returning an indicator the virtualization controller that migration is not available for the SVP, and the process ends. Otherwise, at block 506, if no failure signals are detected, then the process passes to block 508.

Block 508 illustrates triggering checkpoint migrate events for the SVP on the departure system. Next, block 510 depicts a determination whether the mobility controller receives any failure signals from the application scripts triggered by the checkpoint migrate events. If any failure signals are detected, then the process passes to block 512. Otherwise, if no failure signals are detected, then the process passes to block 520.

Block 520 depicts triggering restart premigrate events for the SVP on the arrival system. Next, block 522 illustrates a determination whether the mobility controller receives any failure signals from the application scripts triggered by the restart premigrate events. If any failure signals are detected, then the process passes to block 524. Block 524 illustrates triggering undo events for triggering application scripts to undo the checkpoint and restart processes performed to that point on the departure system and the arrival system, and the process ends. Otherwise, at block 522, if no failure signals are detected, then the process passes to block 528.

Block 528 depicts triggering restart migrate events for the SVP on the arrival system. Next, block 530 illustrates a determination whether the mobility controller receives any failure signals from the application scripts triggered by the restart migrate events. If any failure signals are detected, then the process passes to block 524. If no failure signals are detected, then the process passes to block 532.

Block 532 depicts triggering restart postmigrate events for the SVP on the arrival system. Next, block 534 illustrates a determination whether the mobility controller receives any failure signals from the application scripts triggered by the restart postmigrate events. If any failure signals are detected, then the process passes to block 524. If no failure signals are detected, then the process passes to block 536. Block 536 illustrates triggering a checkpoint postmigrate event for the SVP on the departure system. Next, block 538 illustrates returning an indicator the virtualization controller that the SVP migration is complete, and the process ends.

Referring now to FIG. 6, a high level logic flowchart illustrates a process and program for a migration enabled application script to participate in a checkpoint event during migration of a virtualized instance of the migration enabled application. In the example, the process starts at block 600 and thereafter proceeds to block 602. In the example, block 602 illustrates a determination whether a script is passed a checkpoint premigrate event for an SVP including a virtualized application instance for the application associated with the script. If a script is notified of a checkpoint premigrate event, then the process passes to block 604. Block 604 depicts unconfiguring the SVP to be prepared for checkpointing. Thereafter, block 606 illustrates a determination whether the preparation was successful. If the preparation is not successful, then the process passes to block 620. Block 620 illustrates returning a failure indication to the migration event controller, and the process ends. Otherwise, at block 606, if the preparation was successful, then the process passes to block 608. Block 608 depicts returning a success indicator to the migration event controller, and the process passes to block 610.

Block 610 illustrates a determination whether a script is passed a checkpoint migrate event notification for the SVP including a virtualized application instance for the application associated with the script. If a script is notified of a checkpoint migrate event, then the process passes to block 612. Block 612 depicts collecting the checkpoint data for the SVP in the departure system. Next, block 614 illustrates placing the checkpoint data at a designated location. Thereafter, block 616 depicts a determination whether the checkpointing and data placement are successful. If the checkpoint and data placement are not successful, then the process passes to block 620, the function of which was previously described. If the checkpoint and data placement was successful, then the process passes to block 618. Block 618 illustrates returning a success indicator to the migration event, and the process ends.

While in the example, the flowchart illustrates scripts triggered by both checkpoint premigrate and checkpoint migrate events, in other examples, separate flowcharts representing separate process scripts may be separately triggered by each of the checkpoint premigrate and checkpoint migrate events. In addition, the program and process depicted in the flowchart depicted in FIG. 6 may handle additional or alternate event notifications such as, but not limited to, a checkpoint postmigrate event notification.

With reference now to FIG. 7, a high level logic flowchart depicts a process and program for a migration enabled application script to participate in a restart event during migration of a virtualized application instance of the migration enabled application. In the example, the process starts at block 700 and thereafter proceeds to block 702. In the example, block 702 illustrates a determination whether a script is passed a restart premigrate event for an SVP including a virtualized application instance for the application associated with the script. If a script is notified of a restart premigrate event, then the process passes to block 704. Block 704 depicts configuring the SVP on the arrival system to be prepared for restart. Thereafter, block 706 illustrates a determination whether the preparation was successful. If the preparation is not successful, then the process passes to block 720. Block 720 illustrates returning a failure indication to the migration event controller, and the process ends. Otherwise, at block 706, if the preparation was successful, then the process passes to block 708. Block 708 depicts returning a success indicator to the migration event controller, and the process passes to block 710.

Block 710 illustrates a determination whether a script is passed a restart migrate event notification for an SVP including a virtualized application instance for the application associated with the script. If a script is notified of a restart migrate event, then the process passes to block 712. Block 712 depicts accessing the checkpoint data from the designated located.

Next, block 714 illustrates restoring the SVP with the checkpoint data. Thereafter, block 716 depicts a determination whether the restore process is successful. If the restore process is not successful, then the process passes to block 720, the function of which was previously described. If the restore process was successful, then the process passes to block 718. Block 718 illustrates returning a success indicator to the migration event, and the process ends.

While in the example, the flowchart illustrates scripts triggered by both restart premigrate and restart migrate events, in other examples, separate flowcharts representing separate process scripts may be separately triggered by each of the restart premigrate and restart migrate events. In addition, the program and process depicted in the flowchart depicted in FIG. 7 may handle additional or alternate event notifications, such as a restart postmigrate event notification.

While the invention has been particularly shown and described with reference to a preferred embodiment, it will be understood by those skilled in the art that various changes in form and detail may be made therein without departing from the spirit and scope of the invention.

What is claimed is:

1. A system for enabling an application to participate in migration of a virtualized instance of the application comprising:

one or more processors;

an operating system, for execution by at least one of said one or more processors, operative to manage a virtualized instance of each a plurality of hardware resources and a plurality of migration enabled applications partitioned into one of a plurality of partitions;

a migration event controller of an operating system operative to manage the checkpoint and restart process during migration of a virtualized instance of at least one migration enabled application from among the plurality of migration enabled applications from a departure partition to an arrival partition from among the plurality of partitions;

the migration event controller operative to support the plurality of migration enabled applications to separately specify at least one application specific checkpoint script and restart script to be triggered by at least one checkpoint event and at least one restart event by the migration event controller for the at least one migration enabled application to participate in performing the checkpoint and restart process for state information of the virtualized instance during migration of the virtualized instance from the departure partition to the arrival partition;

the migration event controller operative to facilitate the at least one migration enabled application to participate in migrating the at least one virtualized instance by running the application specific checkpoint script upon notification of a checkpoint event to prepare the at least one virtualized instance to leave the departure partition, to capture the state information for at least one kernel extension of the at least one virtualized instance, and to store the captured state data in a shared location; and the migration event controller operative to facilitate the at least one mi ration enabled application to participate in migrating the at least one virtualized instance by running the application specific restart script upon notification of a restart event to prepare the at least one virtualized instance at the arrival partition to be restarted with the captured state data, to access the captured state data from the shared location and to restore the at least one kernel extension of the at least one virtualized instance at the arrival partition with the captured state information without requiring a reboot of the arrival partition.

2. The system according to claim 1, further comprising;
the migration event controller operative to enable the plurality of migration enabled applications to separately register the at least one application specific checkpoint script and restart script with the migration event controller; and
the migration event controller operative to notify the registered scripts of the at least one checkpoint event and the at least one restart event during migration of the virtualized instance to trigger at least one of the registered scripts to handle migration of at least a portion of state information for the virtualized instance.

3. The system according to claim 1, further comprising the migration event controller operative to send a signal indicating at least one checkpoint event or at least one restart event which is trapped by the plurality of migration enabled applications to trigger one of the at least one application checkpoint script and restart script.

4. The system according to claim 1, further comprising the migration event controller operative to manage the checkpoint and restart process by performing a dynamic reconfiguration checkpoint operation to capture at least one state of at least one process of the at least one virtualized instance at the departure partition and by performing a dynamic reconfiguration restart operation to restart the at least one process from the captured at least one state on the arrival partition without requiring a reboot of the arrival partition.

5. The system according to claim 1, wherein the plurality of partitions comprise a plurality of logical partitions.

6. The system according to claim 1, wherein the state information is mount point information.

7. The system according to claim 1, wherein the state information is kernel extension data.

8. A method for enabling an application to participate in migration of a virtualized instance of the application comprising:
managing a virtualized instance of each a plurality of hardware resources and a plurality of migration enabled applications partitioned into one of a plurality of partitions;
managing, by a migration event controller, the checkpoint and restart process during migration of a virtualized instance of at least one migration enabled application from among the plurality of migration enabled applications from a departure partition to an arrival partition from among the plurality of partitions;
supporting, by the migration event controller, the plurality of migration enabled applications to separately specify at least one application specific checkpoint script and restart script to be triggered by at least one checkpoint event and at least one restart event by the migration event controller for the at least one migration enabled application to participate in performing the checkpoint and restart process for state information of the virtualized instance during migration of the virtualized instance from the departure partition to the arrival partition;
facilitating, by the migration event controller, the at least one migration enabled application to participate in migrating the at least one virtualized instance by running the application specific checkpoint script upon notification of a checkpoint event to prepare the at least one virtualized instance to leave the departure partition, to capture the state information for at least one kernel extension of the at least one virtualized instance, and to store the captured state data in a shared location; and
facilitating, by the migration event controller, the at least one migration enabled application to participate in migrating the at least one virtualized instance by running the application specific restart script upon notification of a restart event to capture prepare the at least one virtualized instance at the arrival partition to be restarted with the captured state data, to access the captured state data from the shared location, and to restore the at least one kernel extension of the at least one virtualized instance at the arrival partition with the captured state information without requiring a reboot of the arrival partition.

9. The method according to claim 8, further comprising;
enabling, by the migration event controller, the plurality of migration enabled applications to separately register the at least one application specific checkpoint script and restart script with the migration event controller; and
notifying, by the migration event controller, the registered scripts of the at least one checkpoint event and the at least one restart event during migration of the virtualized instance to trigger at least one of the registered scripts to handle migration of at least a portion of state information for the virtualized instance.

10. The method according to claim 8, further comprising sending, by the migration event controller, a signal indicating at least one checkpoint event or at least one restart event which is trapped by the plurality of migration enabled applications to trigger one of the at least one application checkpoint script and restart script.

11. The method according to claim 8, further comprising managing, by the migration event controller, the checkpoint and restart process by performing a dynamic reconfiguration checkpoint operation to capture at least one state of at least one process of the at least one virtualized instance at the departure partition and by performing a dynamic reconfiguration restart operation to restart the at least one process from the captured at least one state on the arrival partition without requiring a reboot of the arrival partition.

12. The method according to claim 8, wherein the plurality of partitions comprise a plurality of logical partitions.

13. A program product comprising a storage-type computer-usable medium including a computer-readable program for enabling an application to participate in migration of a virtualized instance of the application, wherein the computer-readable program when executed on a computer causes the computer to:
manage a virtualized instance of each a plurality of hardware resources and a plurality of migration enabled applications partitioned into one of a plurality of partitions;
manage the checkpoint and restart process during migration of a virtualized instance of at least one migration enabled application from among the plurality of migration enabled applications from a departure partition to an arrival partition from among the plurality of partitions;
support the plurality of migration enabled applications to separately specify at least one application specific checkpoint script and restart script to be triggered by at least one checkpoint event and at least one restart event by the migration event controller for the at least one migration enabled application to participate in performing the checkpoint and restart process for state information of the virtualized instance during migration of the virtualized instance from the departure partition to the arrival partition;
facilitate the at least one migration enabled application to participate in migration the at least one virtualized instance by running the application specific checkpoint script upon notification of a checkpoint event to prepare the at least one virtualized instance to leave the departure partition, to capture the state information for at least one kernel extension of the at least one virtualized instance, and to store the captured state data in a shared location; and facilitate the at least one migration enabled application to participate in migration the at least one virtualized instance by running the application specific restart script upon notification of a restart event to capture prepare the at least one virtualized instance at the arrival partition to be restarted with the captured state data, to access the captured state data from the shared location, and to restore the at least one kernel extension of the at least one virtualized instance at the arrival partition with the captured state information without requiring a reboot of the arrival partition.

14. The program product according to claim 13, wherein said computer-readable program is transmitted over a network.

15. The program product according to claim 13, wherein the computer-readable program when executed on a computer further causes the computer to:

facilitate the plurality of migration enabled applications to separately register the at least one application specific checkpoint script and restart script with the migration event controller; and notify the registered scripts of the at least one checkpoint event and the at least one restart event during migration of the virtualized instance to trigger at least one of the registered scripts to handle migration of at least a portion of state information for the virtualized instance.

16. The program product according to claim 13, wherein the computer-readable program when executed on a computer further causes the computer to:

send a signal indicating at least one checkpoint event or at least one restart event which is trapped by the plurality of migration enabled applications to trigger one of the at least one application checkpoint script and restart script.

17. The program product according to claim 13, wherein the computer-readable program when executed on a computer further causes the computer to:

manage the checkpoint and restart process by performing a dynamic reconfiguration checkpoint operation to capture at least one state of at least one process of the at least one virtualized instance at the departure partition and by performing a dynamic reconfiguration restart operation to restart the at least one process from the captured at least one state on the arrival partition without requiring a reboot of the arrival partition.

* * * * *